(12) United States Patent
Getzoff et al.

(10) Patent No.: US 7,756,848 B2
(45) Date of Patent: Jul. 13, 2010

(54) MAPPING SYSTEM FOR ACCESSING AND MAPPING INTELLECTUAL PROPERTY DATA FROM A DATABASE

(75) Inventors: Steven M. Getzoff, Bronx, NY (US); Douglas J. Wood, Wycoff, NJ (US)

(73) Assignee: Reed Smith LLP, Pittsburgh, PA (US)

( * ) Notice: Subject to any disclaimer, the term of this patent is extended or adjusted under 35 U.S.C. 154(b) by 0 days.

(21) Appl. No.: 10/787,675

(22) Filed: Feb. 26, 2004

(65) Prior Publication Data

US 2004/0230604 A1 Nov. 18, 2004

Related U.S. Application Data

(60) Provisional application No. 60/450,391, filed on Feb. 26, 2003.

(51) Int. Cl.
*G06F 17/30* (2006.01)

(52) U.S. Cl. .................. 707/705; 707/724; 707/783

(58) Field of Classification Search .............. 707/3, 707/10, 101; 345/440, 968; 340/995.1; 701/208; 705/7, 10
See application file for complete search history.

(56) References Cited

U.S. PATENT DOCUMENTS

| | | | | |
|---|---|---|---|---|
| 5,790,121 | A * | 8/1998 | Sklar et al. ................ 715/853 |
| 5,945,985 | A * | 8/1999 | Babin et al. ................ 715/209 |
| 6,307,573 | B1 * | 10/2001 | Barros ........................ 715/764 |
| 6,381,603 | B1 * | 4/2002 | Chan et al. .................... 707/10 |
| 6,421,066 | B1 | 7/2002 | Sivan |
| 6,883,146 | B2 * | 4/2005 | Prabhu et al. ............... 715/854 |
| 7,107,285 | B2 * | 9/2006 | von Kaenel et al. ...... 707/104.1 |
| 2002/0145620 | A1 * | 10/2002 | Smith et al. ................ 345/712 |
| 2003/0158743 | A1 * | 8/2003 | Havlick et al. ................ 705/1 |
| 2003/0191654 | A1 * | 10/2003 | Panchal et al. ................ 705/1 |
| 2004/0122841 | A1 * | 6/2004 | Goodman et al. .......... 707/102 |
| 2004/0123245 | A1 * | 6/2004 | Bianchi et al. ............. 715/526 |
| 2004/0139049 | A1 * | 7/2004 | Hancock et al. ................ 707/1 |

OTHER PUBLICATIONS

Press Realease Newswire, "Aurigin System Integrates Cartia ThemeScape with its Intellectual Property Asset Management System", Jul. 2, 1999.*

Su, Slottow, and Mozes, Distributing Proprietary Geographic Data on the World Wide Web—UCLA GIS Database and Map Server, Computers & Geosciences 26 (2000), p. 741-749.

Kreuseler and Schumann, A Flexible Approach for Visual Data Mining, IEEE Transactions on Visualization and Computer Graphics, vol. 8, No. 1, Jan.-Mar. 2002, pp. 39-51.

* cited by examiner

*Primary Examiner*—Khanh B Pham (57) ABSTRACT

The present invention provides systems and methods for displaying a map conveying data and information related to intellectual properties. The system and method allows for a user to choose criteria for a search, which results are graphically displayed. The system and method also provides for applying filtering to the results based on system parameters, such as access permissions.

15 Claims, 8 Drawing Sheets

Hall Dickler Trademark Mapping Project

Search Display Format

Hall Dickler Trademark
Mapping Project

User Administration

FIG. 7

MAPPING SYSTEM FOR ACCESSING AND MAPPING INTELLECTUAL PROPERTY DATA FROM A DATABASE

This Application claims priority under 35 U.S.C. 119(e) of U.S. Provisional Patent Application No. 60/450,391 filed Feb. 26, 2003.

BACKGROUND OF THE INVENTION

1. Field of the Invention

This invention relates to systems and methods for processing data or information to create visual images and graphical displays that covey the data or information. This invention also relates to systems and methods for processing data or information using an operator interface to control the display of the data or information. In particular, this invention relates to systems and methods for processing data concerning intellectual property (i.e., trademarks) to create geographical maps that interactively convey the data.

2. Description of the Prior Art

Therefore, there is an ongoing need for systems and methods of quickly and easily conveying data and information concerning property, especially intellectual property, such as trademarks for example. In particular, there is a need for graphic interfaces that convey intellectual property data in geographical formats, which would certainly enhance a user's ability to manage extensive and diverse IP assets throughout the world.

One type of graphic interface that conveys recorded data in a geographical format is a Geographic Information System. A Geographical Information Systems (GIS) stores, analyzes, and displays geographic data. The geographic data may be spatial (e.g., latitude and longitude) or descriptive (e.g., country names). The spatial data is in a common coordinate system, which is usually latitude and longitude on the earth. Topology is created in a GIS by defining relationships within the geographic data, such as relating the name of a country with coordinate points defining the boundaries of the country.

Previously, GIS's have been used for scientific, educational, commercial, and military applications. For example, U.S. Pat. No. 6,247,019 to Davies describes an Object-based Geographic Information System (GIS) providing each geographical object with a complete geometry that can be stored in a buffer to make possible real-time display of the geographical object as the position of the user changes. For another example, U.S. Pat. No. 6,442,530 to Miller describes a Computer-Based System and Method for Mapping and Conveying Product Location that provides a location for a product as a point on a map. Not surprisingly, GIS's are primarily directed to quickly and clearly conveying data and information concerning geographical location, which requires detailed spatial data, but only a minimum of descriptive data, especially since most potential descriptions for a geographic area are unnecessary and undesirable for quickly and clearly conveying geographical location.

SUMMARY OF THE INVENTION

It is an object of the present invention to provide an IP GIS for displaying the geographic location of intellectual properties as a map. It is also an object of the present invention to provide an interactive method for using such an IP GIS system.

It is an object of the present invention to provide an IP management system that displays geographical maps based on descriptive data in a database. The geographical maps show spatial and/or descriptive data related to intellectual properties. The descriptive data may be displayed as charts, graphs, and tables concurrently with the geographical maps or separately from the maps. It is also an object of the present invention to provide an interactive method for using such an IP management system.

In light of the foregoing background and objects, the present invention provides systems and methods for displaying a map conveying data and information related to intellectual properties. The system and method allows for a user to choose criteria for a search, which results are graphically displayed. The system and method also provides for applying filtering to the results based on system parameters, such as access permissions.

DESCRIPTION OF THE INVENTION

The present invention provides a geographic information system (hereinafter referred to as "the GIS") for properties in general and, more specifically, intellectual properties, such as trademarks for example. The GIS is a particularly useful tool for companies and their representative who manage global property portfolios comprising a large number of properties and/or conflicts and competitors, as well as other complex intellectual property information in numerous countries. The properties and/or assets that are the focus of the GIS of the present invention may be, for example, real property, personal property, intellectual property, or any property or assets that may be established permanently and geographically. Thus, the GIS of the present invention is not used for tracking properties or assets that cannot be meaningfully set in a permanent geographic position. For example, it is not meaningful to set a permanent geographic position for temporary inventories, parcels of mail, or shipments of goods. Accordingly, the GIS of the present invention is not used for managing temporary inventories, parcels of mail, or shipments of goods. Nonetheless, the GIS of the present invention is adapted to "track" or account for changes to the properties and/or assets that are the focus of the GIS, such as, for example, changing visual indicia for a geographic area to indicate that the current primary trademark rights in the geographic area is owned by a competitor when the previously primary trademark rights of the concerned company has been sold or expired.

Figure 1:
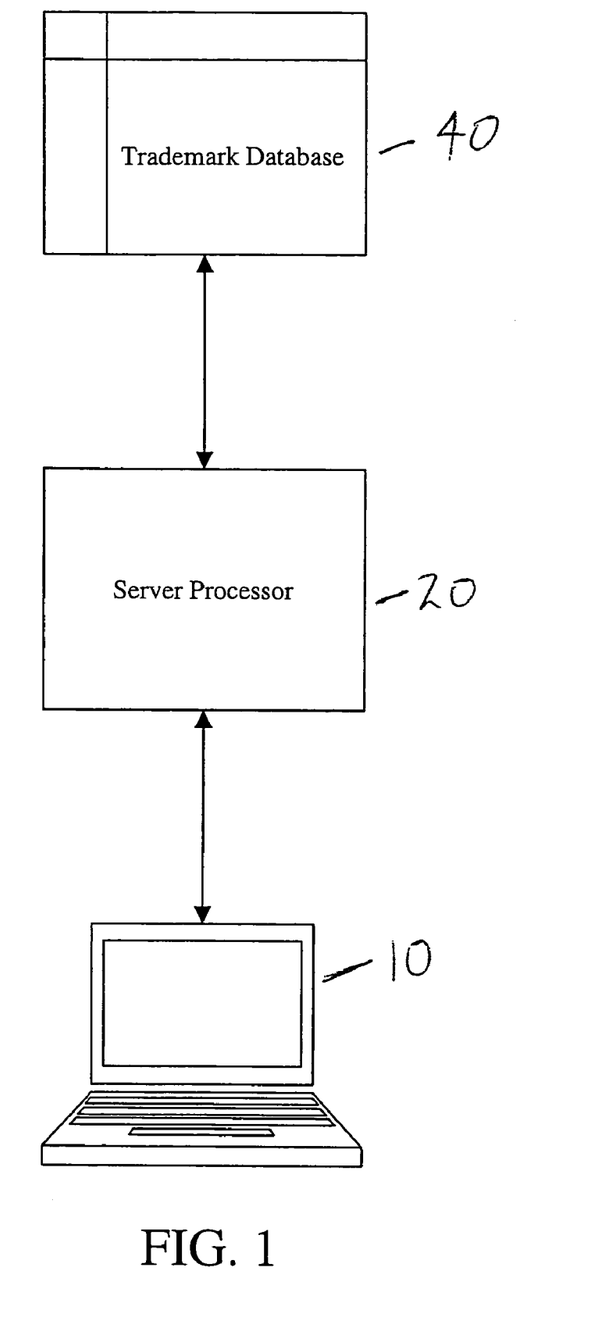
FIG. 1 is a chart of a property mapping system according to the present invention.

Referring to FIG. 1, in a preferred embodiment, the GIS comprises at least a user interface 10, a server processor 20, and a trademark database 40. For ease of use and administration, the user interface 10 is preferably located remotely from the server processor 20 and the trademark database 40. More preferably, the user interface 10 is a remote client that accesses the server processor 20 and trademark database 40 via the Internet (i.e., via a web browser). Any suitable remote connection may be used, such as basic Internet, a virtual private network, wide area network, or another connection that can be configured for reasonably secure access of the trademark database 40.

The trademark database comprises information associated with each of the trademarks in a portfolio. The information associated with each trademark in the trademark database may include, but is not limited to: trademark name and/or a brief description of the trademark, graphic depiction of the trademark, the country of registration, application number, filing date, registration number, registration date, priority application number(s), priority application date(s), applicable trademark classes, a brief description of the goods covered in the applicable trademark classes, the current owner(s), the initial registrant(s) if different from the current owner(s), a case or docket number, any related trademarks, other countries in which the trademark is registered, actions currently pending or expected in the future (e.g., a payment of an annual tax), actual and potential competitors of the current owner(s) and/or initial registrant(s) in the country of registration or other countries, and actually and/or potentially conflicting trademarks, such as similar trademarks with earlier priority dates in the country of registration or other countries.

The preferred user interface of the GIS is a web-based application. Typical components of a web-based application are: forms that allow the user to input information or select certain on-screen data, scripts or program code that interprets and/or processes the input information and generates and/or retrieves results, and templates in which the results may be placed before onward transmission to the client browser by a web server. Any output from the system is rendered in a format understood by a web-browser, such as Microsoft Internet Explorer or Netscape Navigator.

The GIS uses Java Server Pages and Java Servlet technology in order to provide the program code, hosted within a Tomcat Server. Forms and Output Templates are combined into a single data file by using XSL (i.e., an XML Style sheet). Communication with the databases through Microsoft ODBC connections is accomplished through use of a custom "proxy" that delivers results based on XML.

For generation of graphical maps, HDTMS uses Scalable Vector Graphics (SVG), which is an XML-based format, and currently populates a number of template versions of the base files using JavaScript within the client browser. The Final Map is rendered using Adobes SVG plug-in, freely available, and linked in such a way that it appears to render the image within the browser frame. Alternatively, the GIS may employ a more sophisticated level of programmatic access to the individual object elements, such as countries and regions on the maps. For example, if a greater level of access is desired, Batik.

For generation of printable textual report, the GIS of the present invention uses FOP, which is an open-source framework that allows the combination of XSL Templates and XML data into a PDF format, read using an Adobe plug-in.

All screens displayed in HDTMS are based on an XSL style sheet template. It is both preprocessed and post-processed by a custom written script (or program) written using Java Server Pages or Java Servlet format. The basic similarity of these two technologies is that the code structure conforms to the Java Programming Language and is either pre-compiled before deployment in the application or compiled to the Java byte-code standard by the web server host.

Source code to each of these scripts is supplied in pre-compiled form to the customer along with the application and can be printed. Post-compiled form is a binary object file that complies with the Java byte-code standard, but could have a different software pattern depending on the Java language compiler.

All data, except that entered by users in order to refine search criteria and add users, is stored in a database. It is transferred there using external programs drawing the information from another source system.

Alternatively, any known and/or suitable web-based application may be used in the GIS of the present invention. For example, the GIS of the present invention can employ forms, scripts, and templates similar to those of common web-based search engines, which will be familiar to a user of the GIS of the present invention. The GIS of the present invention using forms, scripts, and templates similar to those of common web-based search engines, such as Yahoo and Google, with preferably include an single box for the user to enter simple text from which multiple results will be generated in an order weighted by the administrator of the system and/or by an algorithm that weights the results according to previous user input.

Referring to the drawings, the following is a description of a preferred method for using the GIS.

Figure 2:
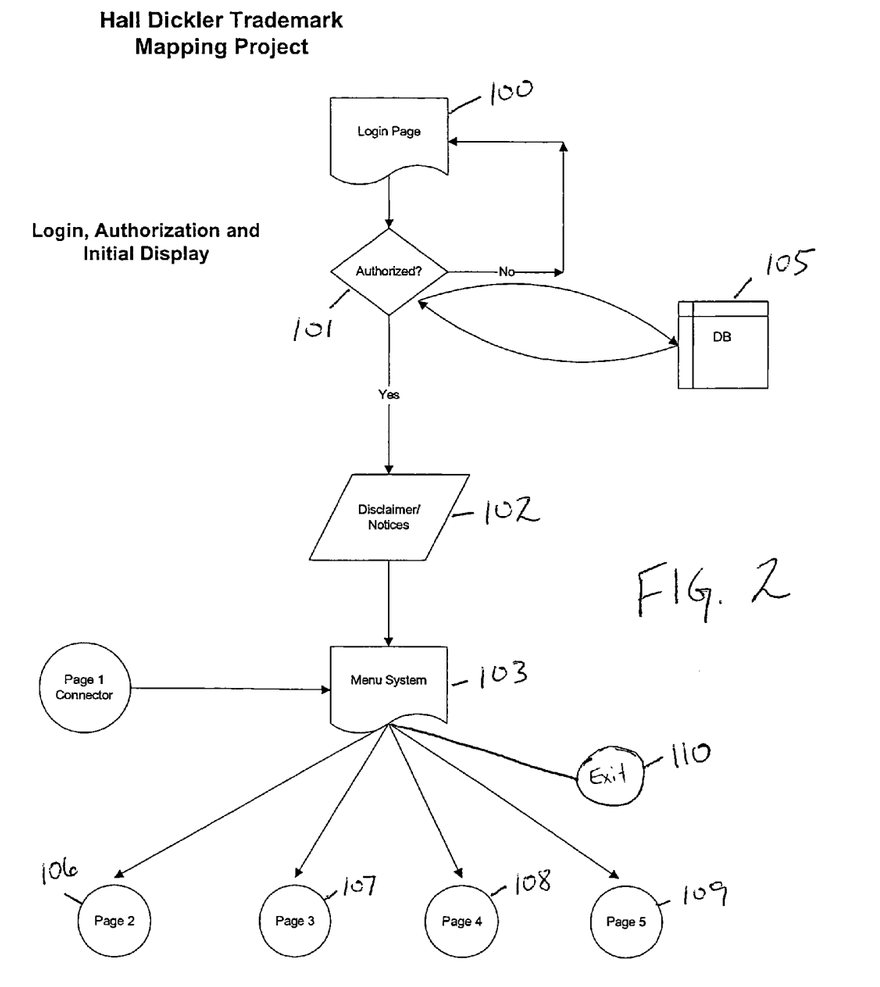
FIG. 2 is a flow chart of login, authorization, and initial display for the property mapping system of FIG. 1.

Referring to FIG. 2, there is a flow chart showing login, authorization, and initial display for the GIS. Upon access to the GIS, a prospective user of the GIS is presented with a login page 100 that prompts the prospective user to enter a user-name and password, or other security code(s). An authorization process 101 subsequently accesses a User Database 105, which contains the names and passwords of all authorized users. Authorization process 101 compares the user-name and password entered by the prospective user against the User Database 105. Preferably, there is no direct access to the database by the user and, in the production version; all data transmission between client and server is encrypted to ensure integrity. If the authorization process 101 cannot match the user-name and password entered by the prospective user to any authorized user in the User Database 105, the prospective user cannot proceed past the login page 100. If the user-name and password entered by the prospective user matches an authorized user in the User Database 105, the authorization process 101 recognizes the prospective user as an authorized user and allows the authorized user to proceed to the menu system page 103. Optionally, after the user is authorized by the authorization process 101, one or more notices and/or disclaimers 102 may be displayed by the GIS. For example, the notices and/or disclaimers 102 may be a legal disclaimer or notices containing current information for the user (e.g., the pendency of a system update).

The menu system page 103, displays a menu that offers the user several different search tools, such as a Trademark Name Search Tool 106, Company Search Tool 107, and Advanced or Categories Search Tool 108. In addition, if the user is a system administrator, the menu system page will display a menu that offers several different administration tools 109, which are discussed in more detail hereinafter. The menu systems page also offers the user a logout 110 that logs the user out of the GIS.

Figure 3:
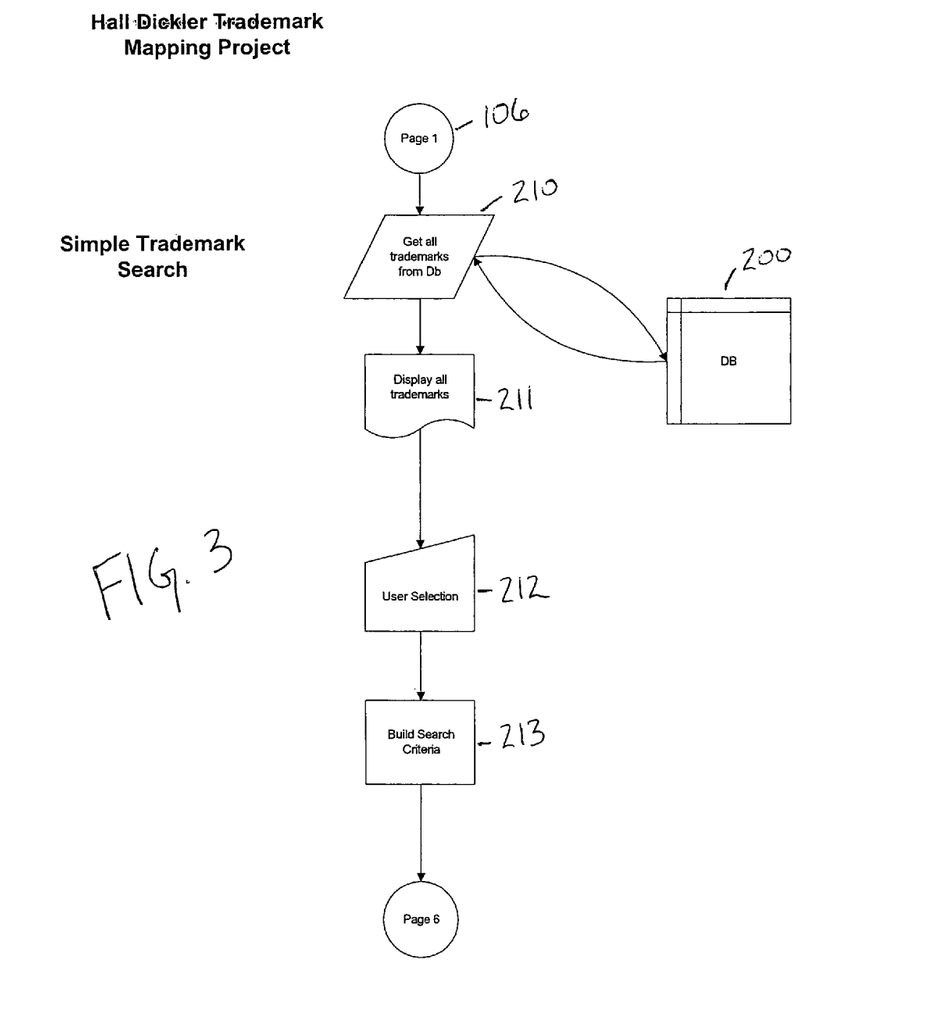
FIG. 3 is a flow chart of a property name search process using the property mapping system of FIG. 1.

Referring to FIG. 3, there is a flow chart showing a search using the Trademark Name Search Tool 106. Upon selecting the Trademark Name Search Tool 106, the GIS obtains from a trademark database 200 all trademark name data 210 that the user is authorized to view. Then, the GIS uses the trademark name data 210 to present the user with a trademark name display 211. As a default, the trademark name display 211 shows all trademark names that were obtained from the trademark database 200.

The user is prompted by the GIS to manually input a user selection 212, which selection is one trademark name from the trademark name display 211. Upon receiving the user selection 212, the GIS invokes a criteria building process 213 that builds the search criterion(s) used to search the trademark database 200 for further information on the selected trademark name. For the Trademark Name Search Tool 106, the only search criterion is the user-selected trademark name. As discussed in more detail in reference to the Search Display Formatting Tool 500 (see FIG. 5), the search criterion(s) are processed to get data from the trademark database, which data is displayed to the user in geographical or text format.

Figure 4:
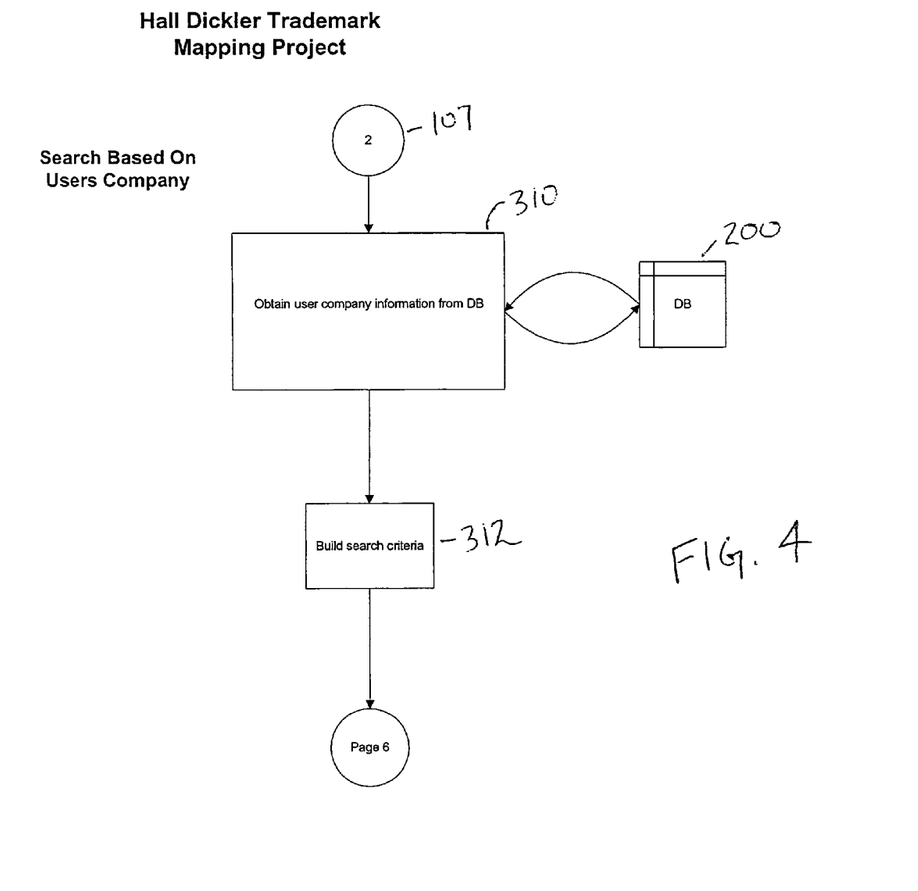
FIG. 4 is a flow chart of a search process based on the company of a user of the property mapping system of FIG. 1.

Referring to FIG. 4, there is a flow chart showing a search using the Company Name Search Tool 107. Upon selecting the Company Name Search Tool 107, the GIS obtains from a trademark database 200 all company name data 310 that the user is authorized to view. The user in the Company Name Search Tool 107 may be presented with a display from which to select one or more companies. Since the GIS is preferably configured as a system remotely accessible by the representatives of client companies, the representatives of a particular client company that accesses the GIS will be authorized to view only that data in the trademark database 200 that concerns trademarks owned by the particular client company.

The GIS invokes a criteria building process 312 that builds the search criterion(s) used to search the trademark database 200 for further information on the company. For the Company Name Search Tool 107, the only search criterion is the company name. As discussed in more detail in reference to the Search Display Formatting Tool 500 (see FIG. 5), the search criterion(s) are processed to get data from the trademark database, which data is displayed to the user in geographical or text format.

Figure 5:
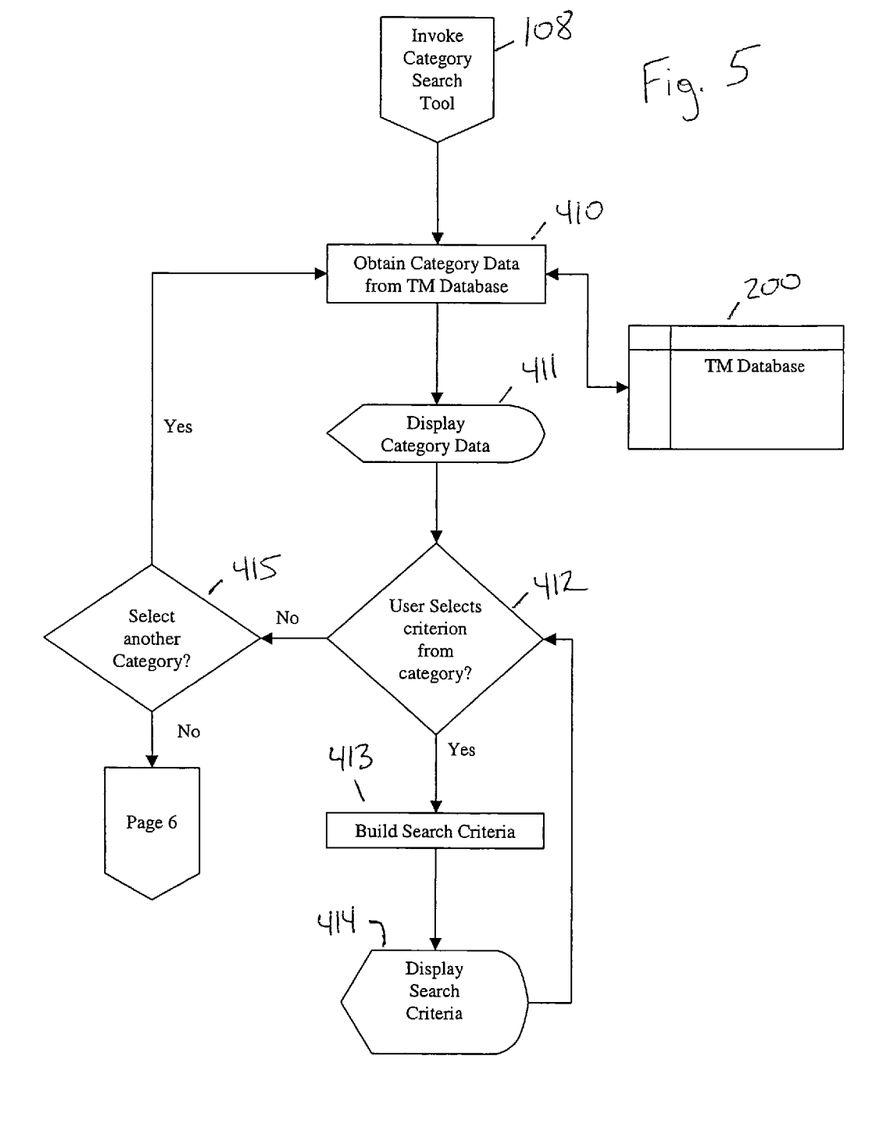
FIG. 5 is a flow chart of an advanced or category search process for the property mapping system of FIG. 1.

Referring to FIG. 5, there is shown a flowchart of the Advanced or Category Search Tool 108. An advanced search steers the user to a set of screens that allows the user to select categories of information from the trademark database. In addition to trademark name and company (owner), categories that may be selected in an advanced search include, but are not limited to, client name (different from owner name), agents or attorneys, countries or regions, and status. Users select each category as desired to form a search "criteria".

Upon selecting the Category Search Tool 108, the GIS obtains category data 410 from the trademark database 200. Then, the GIS uses the category data 410 to present the user with a category data display 411. As default, the GIS obtains trademark name data and displays all the trademark names contained in trademark database 200.

The user is prompted by the GIS to make a search criterion selection 412 from the category data display 411. Upon receiving the search criterion selection 412 from the user, the GIS invokes a search criteria building process 413 that builds the search criterion(s) used to search the trademark database 200. Once built, the GIS will show the search criteria in a display 414 for review by the user. The user has the option of selecting multiple criterions from a given category data display. When the user has finished selecting the criterions from a given category data display, the user may review criterions from other categories by making a new category selection 415. If the user makes a new category selection 415, the GIS obtains category data and displays it to the user, who selects one or more criterion that are built into the search criteria. When the user has decided not to select another category, the search criteria are processed. As discussed in more detail in reference to the Search Display Formatting Tool 500 (see FIG. 5), the search criterion(s) are processed to get data from the trademark database, which data is displayed to the user in geographical or text format.

As discussed above, each search tool 106, 107, and 108 is designed to create search criterion(s). The search criterion from the Trademark Name Search Tool 106 is a user-selected trademark name. The search criterion from the Company Name Search Tool 107 is a company name that is either user-selected or pre-authorized. Alternatively, multiple company names may be used as search criteria in the Company Name Search Tool 107. The search criterions from the Category Search tool 108 are selected by the user from various categories of data.

Figure 6:
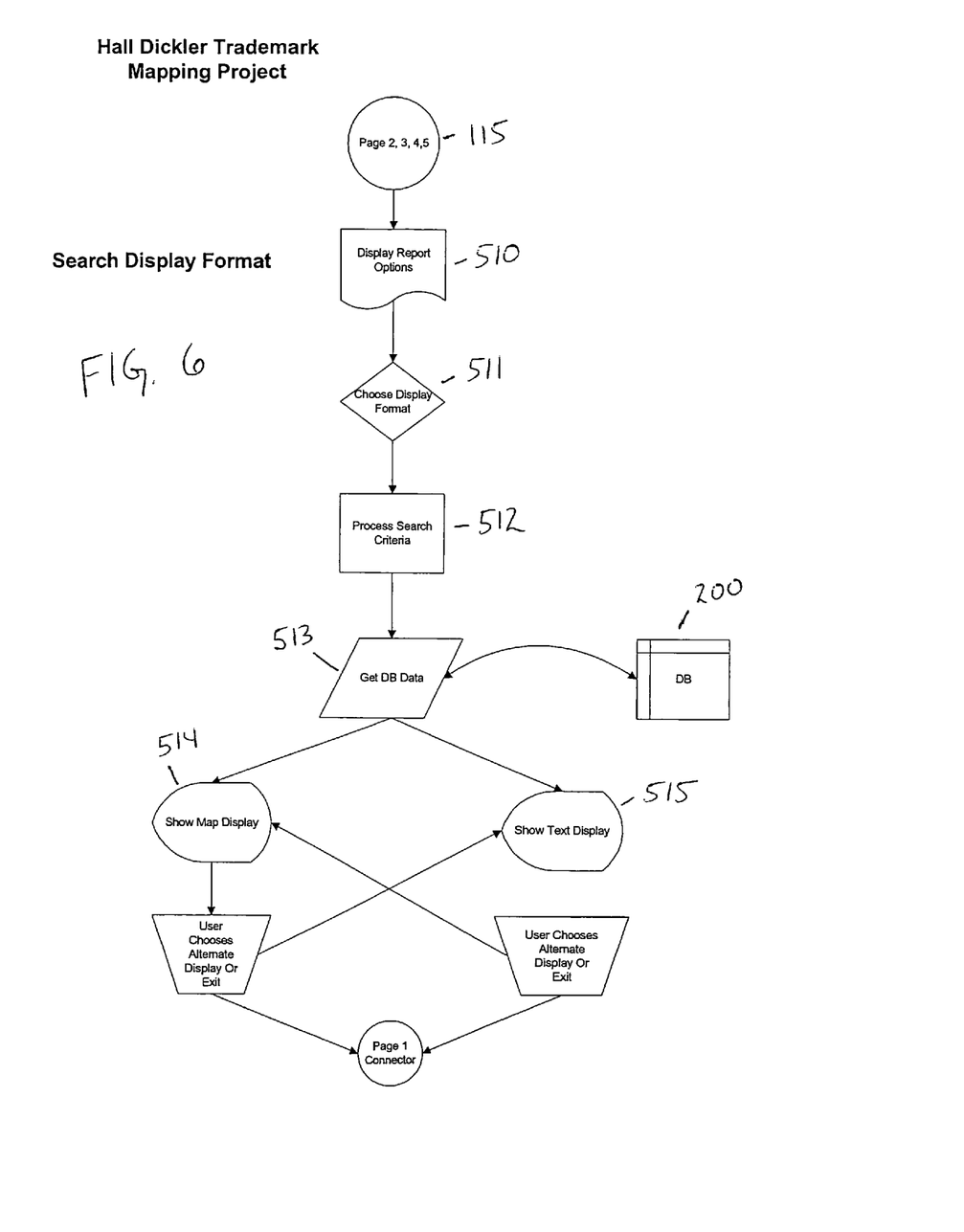
FIG. 6 is a flow chart showing a search display format process for the property mapping system of FIG. 1.

Referring to FIG. 6, there is shown a flowchart for displaying the results of a search. In general, once the GIS has built the search criterion(s), the user is asked to select the type of report they wish to display. After the user selects the type of report they wish to display, the search criterions are processed by the GIS to obtain the search results from the Trademark Database 200, which search results are displayed in the user-selected format.

As shown in FIG. 6, the Search Display Process 115 will be invoked after the search criteria are built (see FIG. 2, ref. no. 213, FIG. 3, ref. no. 312, and FIG. 4). A display 510 presents the user with the various report formats that the GIS can produce. Preferably, the various report formats include a geographical information format and a traditional chart format. After user selection 511, wherein the user chooses the desired report format, a search process 512 uses the search criterions to search the trademark database 200. The search process 512 returns search result data 513. The search result data 513 are displayed to the user in the user-selected report format. The GIS may present the search results as a map display 514 or as a text display 515. Each of the various report displays of the GIS preferably contains links to further refine the selection and/or display an alternate type of report display.

The primary component of the geographical report format or map display 514 is a map projection of the earth showing the boundaries of all the countries thereof. Other relevant political or geographical boundaries or country-groups may be displayed, such as the European Union or PCT member states. Registrations and applications that match the search criterions are not directly reported in the map display 514. Instead the map display 514 highlights or otherwise indicates the countries in which registrations and application matching the search criterions are issued or pending. Preferably, for ease of use, the names of the countries highlighted or otherwise indicated in the map display 514 are shown with a reference line connecting each country name to the correct part of the map projection. When two or more search criterions from a single category have been selected by the user, the map display 514 preferably distinguishes between the search criterions, for example, by color. For example, if the user desires to search for trademarks for two or more companies, the map display 514 may show countries having trademarks from the first of the two companies in red, while the countries having trademarks from the second of the two companies is shown in green. The names of the countries may also be shown in the applicable company color. If each company has a trademark in a given country, that country may be highlighted with stripes of red and green, or in some other distinguishable appearance.

Figure 7:
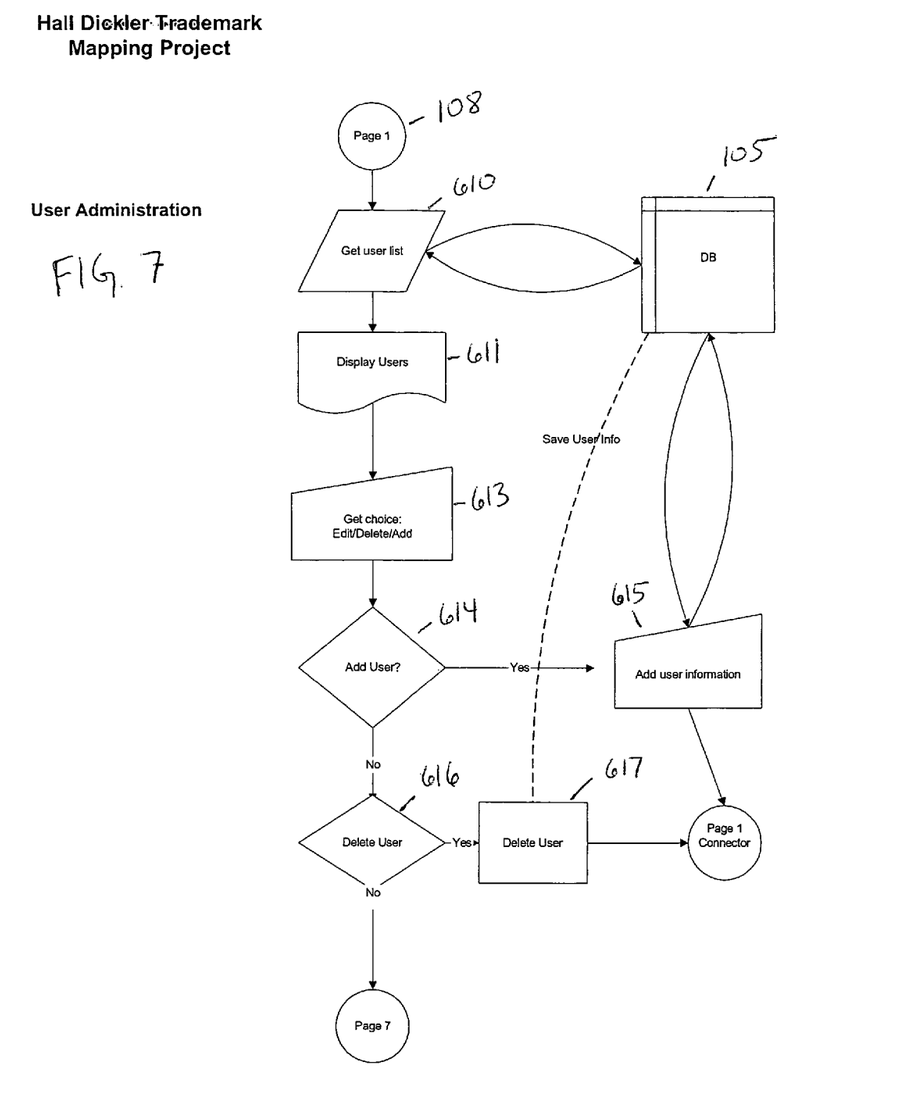
FIG. 7 is a flow chart of a user administration process for the property mapping system of FIG. 1.

Referring to FIG. 7, there is illustrated a flowchart for user administration tool 108. If the user is a system manager, upon selection of the User Administration Tool 108, the GIS accesses the user database 105 and obtains a user list 610 that is presented to the system manager as a list 611. The system manager may choose 613 to edit, add, or delete user data in the user database 105. If the system manager makes the decision 614 to add a user, the GIS prompts the system manager to input 615 data regarding the user to be added, such as user-name and password. The data for the newly added user is stored in the user database 105. If the system manager makes the decision 616 to delete a user, the user to be deleted is selected by the system manager and the GIS processes 617 the removal of all data regarding the deleted user from the user database 105. The method for editing user information is described in reference to FIG. 7.

Figure 8:
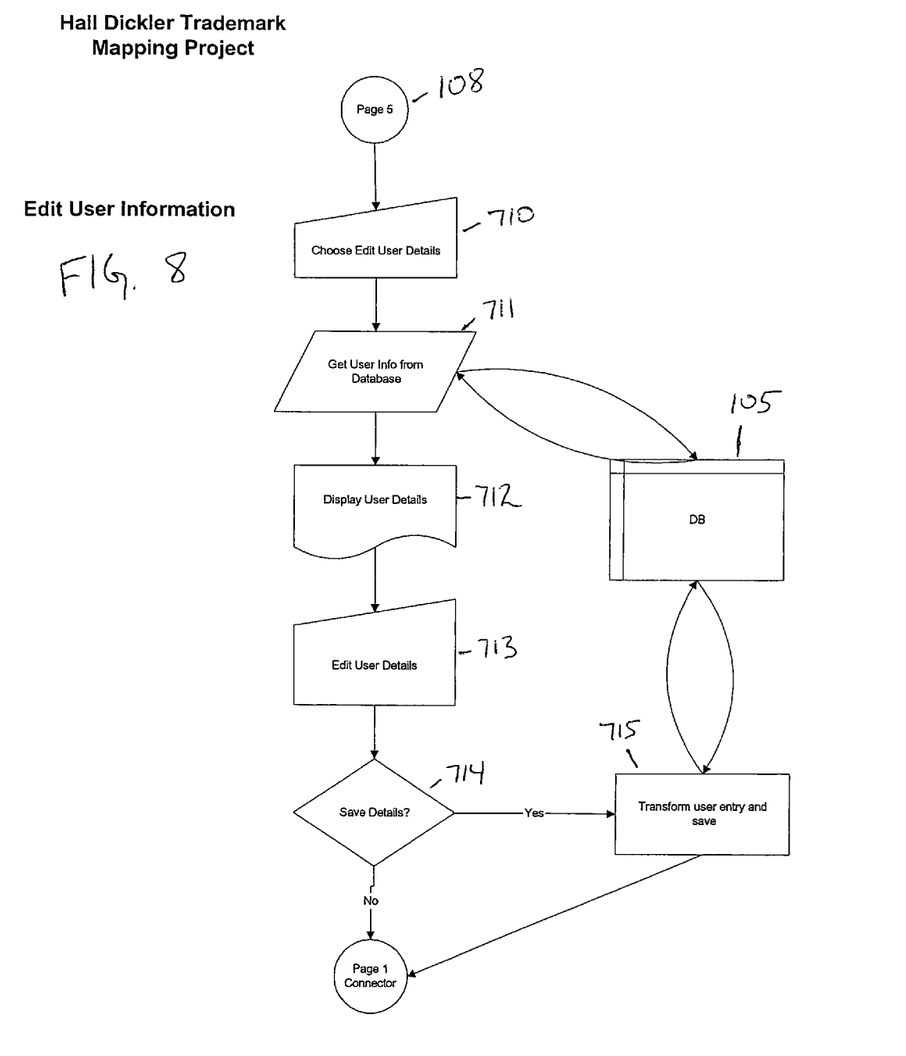
FIG. 8 is a flow chart showing a process to edit user information for the property mapping system of FIG. 1.

Referring to FIG. 8, there is illustrated a flowchart for editing user information. If the system manager makes the decision 710 to edit user information contained in the user database 105, the user to be edited is selected by the system manager and the GIS accesses the user database 105 and obtains detailed user data 711 that is presented to the system manager as a detailed user display 712. The system manager inputs 713 new data and/or replaces old data regarding the user, and the edited user data is stored 715 in the user database 105 after the system manager is prompted 714 by the GIS to confirm the edited user data is to be saved.

Although the best mode of the present invention has been described by way of illustration and examples, the description is not to be construed as limiting the invention. Various modifications may occur to those skilled in the art without departing from the true spirit and scope of the invention as defined herein.

We claim:

1. An intellectual property geographical information system for displaying the geographic location of intellectual properties comprising:
   a processor;
   a database storing intellectual property data which includes intellectual property data of intellectual properties of a client;
   a display device; and
   a user interface executable by the processor and operable to display through the display device interactive geographical maps by retrieving selected intellectual property data based on user input;
   wherein the intellectual property data is trademark data, the intellectual property data includes intellectual property name and filing date;
   wherein the processor accesses the database to provide the user with a geographical map of the selected intellectual property data; and
   wherein a user associated with the client only has access the intellectual property data of the client and intellectual property data of competitors of the client.

2. The intellectual property geographical information system according to claim 1;
   wherein the trademark data includes a graphic depiction of the trademark, and a country of registration of the trademark.

3. The intellectual property geographical information system according to claim 2;
   wherein the trademark data includes an application number in the country of the registration.

4. The intellectual property geographical information system according to claim 1;
   wherein the trademark data includes a trademark registration number and date.

5. The intellectual property geographical information system according to claim 1;
   wherein the trademark data includes trademark application numbers, and priority application dates.

6. The intellectual property geographical information system according to claim 1;
   wherein the trademark data includes applicable trademark classes, and a brief description of goods covered in the applicable trademark classes.

7. The intellectual property geographical information system according to claim 1;
   wherein the trademark data includes current owners of trademarks, initial registrants and a case or docket number.

8. The intellectual property geographical information system according to claim 1;
   wherein the trademark data includes trademarks and similar trademark with earlier priority dates in the country of registration or other countries.

9. The intellectual property geographical information system according to claim 1;
   wherein the user associated with the client only has access the intellectual property data of the client.

10. The intellectual property geographical information system according to claim 1;
    wherein first countries representing the location of the intellectual properties of one company of the client are depicted in a first color;
    wherein the first countries are depicted on a single geographical map showing the geographical relationships of the first countries.

11. The intellectual property geographical information system according to claim 10;
    wherein second countries representing the location of intellectual properties of a second company of the client are depicted in a second color different from the first color; and
    wherein the first and second countries are depicted on the single geographical map showing the geographical relationships of the first and second countries.

12. The intellectual property geographical information system according to claim 10;
    wherein third countries representing the location of intellectual properties of a competitor company are depicted in a third color different from the first color; and
    wherein the first and third countries are depicted on the single geographical map showing the geographical relationships of the first and third countries.

13. An interactive method for using an intellectual property geographical information system comprising:
    displaying by a display device an interactive geographical map of intellectual properties, the geographical map of intellectual properties being produced at the request of a user associated with a client by a processor accessing a database of intellectual property data which includes intellectual property data of the client;
    wherein the intellectual property data is trademark data, the intellectual property data includes intellectual property name and filing date;
    wherein the processor accesses the database to provide the user with the interactive geographical map of at least one of the intellectual properties; and
    wherein the user only has access the intellectual property data of the client and competitors of the client.

14. The interactive method for using an intellectual property geographical information system according to claim 13, further comprising the step of accessing the database containing trademark name and trademark filing date.

15. An intellectual property geographical information system for displaying the geographic location of intellectual properties comprising:
- a processor;
- a database storing intellectual property data of a single intellectual property portfolio;
- a display device; and
- a user interface executable by the processor and operable to display through the display device interactive geographical maps by retrieving selected intellectual property data of the single intellectual property portfolio based on user input;
- wherein the intellectual property data is trademark data, the intellectual property data includes intellectual property name and filing date;
- wherein the processor accesses the database to provide a user with a geographical map of the selected intellectual property data;
- wherein the user only has access the intellectual property data of the client and competitor of the client; and
- wherein the processor accesses the database to provide the user with a geographical map simultaneously depicting geographical locations of a single selected piece of intellectual property.

* * * * *